United States Patent [19]
Dehennau et al.

[11] Patent Number: 5,824,254
[45] Date of Patent: Oct. 20, 1998

[54] PROCESS FOR MOULDING A THERMOPLASTIC MATERIAL BY INJECTION ONTO A ROTATING CORE

[75] Inventors: Claude Dehennau, Waterloo; Vito Leo, Glimes; Charles Cuvelliez, Rhode-Saint-Genese, all of Belgium

[73] Assignee: Solvay (Société Anonyme), Brussels, Belgium

[21] Appl. No.: 688,928

[22] Filed: Jul. 31, 1996

[30] Foreign Application Priority Data

Aug. 1, 1995 [BE] Belgium ............................ 09500665

[51] Int. Cl.$^6$ .................................................. B29C 45/00
[52] U.S. Cl. ................ 264/312; 264/328.12; 264/328.16
[58] Field of Search ............................... 264/312, 328.12, 264/328.16

[56] References Cited

U.S. PATENT DOCUMENTS 3,907,952  9/1975  Cleereman .
4,783,301  11/1988  Hong .................................. 264/328.16
5,571,583  11/1996  Cao et al. ........................... 264/328.12

FOREIGN PATENT DOCUMENTS 667335  7/1965  Belgium .
696572  4/1967  Belgium .

OTHER PUBLICATIONS

H.M. Laun: "Description of the non–linear shear behaviour of a low density polyethylene melt by means of an . . . ". In: Rheologica Acta, An Internal Journal of Rheology, vol. 17, No. 1, Jan./Feb. 1978, pp. 1–15.

*Primary Examiner*—James Derrington
*Attorney, Agent, or Firm*—Spencer & Frank

[57] ABSTRACT

Process for moulding a thermoplastic material by injection onto a rotating core, in which the relative rotation of the various parts of the mould takes place during at least a part of the dwell stage and ends before the end of this stage. This process, which yields good results with polyolefins, makes it possible to manufacture articles such as receptacles and cylinders, exhibiting good mechanical properties.

9 Claims, No Drawings

PROCESS FOR MOULDING A THERMOPLASTIC MATERIAL BY INJECTION ONTO A ROTATING CORE

FIELD OF THE INVENTION

The present invention relates to a process for moulding a thermoplastic material by injection onto a rotating core.

TECHNOLOGY REVIEW

The technique of moulding by injection onto a rotating core, described especially in U.S. Pat. No. 3,907,952, makes it possible to manufacture articles which have a symmetry of revolution and a high mechanical strength. It consists in injecting a molten thermoplastic material into a mould a part of which—generally a middle part which is referred to as a core—is rotatable in relation to the other and is kept rotating during the introduction of the thermoplastic material into the mould. This technique strongly orients the thermoplastic material in the circumferential direction, and this makes it possible to compensate the predominantly axial orientation induced by the injection in the case of the mould being filled from one end, and to "obliterate" possible weld lines in the case of a side filling of the mould. It is thus possible to obtain injection-moulded articles such as receptacles, cylinders, sleeves and the like, whose mechanical strength is greater than that of articles injection-moulded by means of a conventional technique of injection moulding, that is to say into a mould in which all the parts are immobile in relation to one another.

The manufacture of an article by injection moulding includes essentially two stages. During the first, known as injection or filling stage, the molten thermoplastic material is injected into the mould at a high flow rate. During the second, called dwell stage, the thermoplastic material, which then fully occupies the mould, is kept under pressure, approximately until it has solidified. During the dwell stage the thermoplastic material cools and therefore contracts. For this reason a very small quantity of thermoplastic material ("dwell flow") must continue to be injected into the mould, until the solidification is complete, with a view to compensating this shrinkage and keeping the pressure constant. After the thermoplastic material has solidified the article can be withdrawn from the mould.

In known alternative forms of the technique for injection onto a rotating core the relative rotation of the various parts of the mould takes place at different instants. For reasons of convenience, this rotation generally begins as soon as the filling stage starts and often continues until the end of the dwell stage, and even sometimes beyond this, that is to say after the thermoplastic material has ceased to be kept under pressure. This choice appears to be logical because it makes it possible to subject the thermoplastic material, at least a portion of which is still molten, as long as possible to stresses enabling it to be oriented circumferentially.

SUMMARY OF THE INVENTION

However, it has now been found that some characteristics, in particular the mechanical strength, of articles manufactured by moulding a thermoplastic material by injection onto a rotating core could be considerably improved by a more judicious choice of the moment when the relative rotation of the various parts of the mould is performed. It has in particular been found, surprisingly, that a belated stopping of this rotation is unfavourable for the mechanical properties.

DETAILED DESCRIPTION OF THE INVENTION

Consequently, the present invention is aimed at providing an improved process for moulding a thermoplastic material by injection onto a rotating core, in which the various parts of the mould are in relative rotation for at least a portion of the dwell stage, which is characterized in that this rotation ends before the end of the dwell stage.

The thermoplastic material in question includes at least one thermoplastic polymer. The thermoplastic material preferably consists essentially of at least one thermoplastic polymer. Any thermoplastic polymer may be employed, especially vinyl chloride polymers, polyamides and polyolefins. Good results have been obtained when the thermoplastic material includes at least one polyolefin. Among the polyolefins it is preferred to employ monoolefin polymers such as ethylene and/or propylene polymers (including their copolymers additionally including one or several other monomers).

Good results have been obtained when the thermoplastic material includes at least one semicrystalline thermoplastic polymer. At least 50 mass % of the thermoplastic material preferably consists of one or several semicrystalline thermoplastic polymers. In a particularly preferred manner the thermoplastic material consists essentially of one or several semicrystalline thermoplastic polymers. Semicrystalline thermoplastic polymers are intended to denote thermoplastic polymers which are not amorphous. Examples of semicrystalline thermoplastic polymers are polyamides (in particular aromatic ones), polyphenylene sulphide, polyethylene and polypropylene.

Furthermore, it is advantageous to employ thermoplastic polymers which crystallize rapidly, such as, for example, polyethylene (PE). If need be, a nucleating agent may be added to a thermoplastic polymer which, in its own right, might not exhibit a rapid crystallization.

In addition, the thermoplastic material employed preferably exhibits properties which are generally required with a view to injection moulding, for example a suitable viscosity, good demouldability, good behaviour under high shear, good heat stability and the like.

The process of the invention yields results which are clearly superior to those of the previously known processes, in particular when applied to easily orientable thermoplastic materials, especially to thermoplastic materials which are viscous and/or include one or more fillers.

With regard to viscosity, it is very particularly preferred that the thermoplastic material should have a modulus of relaxation in shear $G_n(7.5)$ higher than 0.15.

$G_n(7.5)$ denotes the normalized value of the modulus of relaxation in shear of the thermoplastic material, $\dot{G}(t)$ (as described by H. M. Laun in Rheologica Acta, vol. 17, No. 1 (Jan./Feb. 1978), pp. 1–15, in particular in equation [8]), at 7.5 seconds and at a temperature 30° C. higher than the melting temperature of the thermoplastic material in question ($T_m$ as measured by DSC (differential scanning calorimetry) at a rate of 10K per minute). More precisely, on the basis of measurements of the elastic and viscous moduli as a function of the excitation frequency (from 0.01 to 100 $s^{-1}$), the generalized Maxwell modulus which comes closest thereto is deduced. This model then makes it possible to plot a curve representing the change of the modulus of relaxation in shear as a function of time, which is normalized so that $G_n(t)=100$ for $t=0$. In other words, $G_n(t)=100\times\dot{G}(t)/\dot{G}(0)$. The value of $G_n(t)$ for $t=7.5$ s is then read off this curve. The Applicant Company has found that, among all the values of t at which the modulus of relaxation in shear $G_n(t)$ can be evaluated, it is in the case of $t=7.5$ s that it is possible to define the most reliable and most uniform criterion making it possible to characterize the thermoplastic materials which give the best results when they are injection-moulded onto a rotating core.

This modulus of relaxation in shear is preferably higher than 0.2, particularly preferably higher than 0.3 and ideally higher than 0.5. Furthermore, it is preferred that the value of $G_n(7.5)$ should be lower than 10 and very particularly lower than 5.

As set out above, in addition to at least one thermoplastic polymer, the thermoplastic material which is injection-moulded may furthermore advantageously include at least one filler.

Any known filler can be employed. Examples of fillers that can be employed, given without any limitation being implied, are talc, calcium carbonate and mica. It is preferred to employ anisotropic fillers, for example in the form of flakes or fibres. The use of fibres is advantageous where mechanical properties are concerned. Examples of fibres which may be mentioned are glass and carbon fibres and polymeric fibres such as aramid fibres. It is preferred that the filler should include glass fibres. The improvement in results is especially remarkable when the content of the filler(s) exceeds 10% and in particular exceeds 20%, relative to the total weight of the thermoplastic material and of the filler(s).

These two alternative forms relating to the use of an easily orientable thermoplastic material are particularly advantageous since the process of the invention in these cases results in a particularly marked increase in the mechanical properties.

Finally, depending on the needs, the thermoplastic material may also optionally contain one or several conventional additives such as pigments, anti-oxidants, stabilizers, flame retardants and the like.

As indicated above, the injection onto a rotating core consists in injecting a molten thermoplastic material into a mould including at least two parts rotatable in relation to one another, defining a closed volume.

The mould generally includes a central member (core) placed inside a hollow member (cavity). The core is usually symmetrical in revolution, for example cylindrical or conical, it being possible for the cavity to be symmetrical in revolution or virtually symmetrical in revolution, that is to say that it may optionally comprise one or more portions which are not symmetrical in revolution, such as, for example, a rib or a boss extending axially or helically, as a hollow or in relief, over at least a portion of its length. It is thus possible to manufacture, for example, a "cylinder" in which the central cavity would have a circular section and the external surface an octagonal section. It is desirable that the axes of symmetry or of virtual symmetry of the core and of the cavity should be at least approximately coincident and at least approximately parallel. Their axes are preferably exactly coincident. It is convenient that the core should be rotatable in relation to the stationary cavity. However, nothing prevents the core from being stationary and the cavity rotatable, or else both being rotatable at different speeds.

Although the more common case is that of a core exhibiting a symmetry of revolution, a special alternative form is that according to which the core does not exhibit a symmetry of revolution. By way of example of this alternative form, it would be possible to employ a core whose cross-section would be polygonal over at least a portion of its length.

When a known process for injection moulding on a rotating core is employed for manufacturing an article which is externally not symmetrical in revolution, that is to say an article exhibiting one or more thickness variations in the circumferential direction, such as, for example, ribs or studs on its external surface, these extra thicknesses which are not symmetrical in revolution perturb the circumferential flow of the plastic material during the rotation of the core, even when the latter has a symmetry of revolution, and it is found (by producing sections in the article thus manufactured) that the thermoplastic material recirculates opposite these extra thicknesses which are not symmetrical in revolution (vortex formation). These perturbations of the flow mechanically weaken the article in these places. This serious disadvantage, which is still more marked when an easily orientable thermoplastic material is employed, is not produced when a process in accordance with the invention is employed; in this case no significant perturbation of the flow is found and no reduction in the mechanical strength of the article at the place of the extra thicknesses.

This is why the invention also relates to a process for moulding by injection onto a rotating core as defined above, in which the mould has a form which is adapted to the manufacture of an article including one or several appreciable extra thicknesses which are not symmetrical in revolution. An appreciable extra thickness which is not symmetrical in revolution is intended to denote a change in thickness D of at least 50% (that is to say measuring at least 50% of the thickness of the portion of the wall of the article adjoining this extra thickness), which is produced over a circumferential distance smaller than D. According to orientations other than the circumferential one, the extra thickness may extend over a substantial portion of the article as, for example, in the case of a rib which is parallel to the axis of the article or helical, or may, on the contrary, be highly localized, as in the case of side studs or end portions. The mould must exhibit, in negative form, the shape of the article to be manufactured.

As set out above, the various parts of the mould are in relative rotation during at least a portion of the dwell stage, and the rotation ends before the end of the dwell stage. In other words, the rotation is not performed entirely throughout the filling stage. It is preferable that at least 70% of the rotation period should be within the dwell stage.

The rotation may commence at any instant, for example as soon as the filling stage begins or during the latter. However, it is advantageous that this rotation should begin after the end of the mould filling stage, that is to say that the rotation should intervene only during the dwell stage.

The rotation period is preferably at least 10% of the duration of the dwell stage, preferably at least 20%. In a particularly preferred manner it is furthermore not more than 90% of this duration and in particular not more than 80% of this duration. In the case of articles whose thickness is of the order of 1 to 5 mm the rotation period is generally from approximately 10 to 120 s, preferably from 30 to 80 s. This period is related to the nature of the thermoplastic material and in particular to its solidification time, which increases approximately as the square of the thickness of the article.

According to a particular alternative form, the period of relative rotation of the various parts of the mould may be made up of a number of rotation stages, separated by stages of immobility. This alternative form produces a better distribution of the orientation within the article and a better attenuation of the flow perturbations, especially in line with possible extra thicknesses which are not symmetrical in revolution.

The relative speed of rotation of the various parts of the mould is advantageously such that the average shear rate to which the thermoplastic material is subjected is at least 25 $s^{-1}$, preferably higher than 30 $s^{-1}$. It is furthermore generally such that this rate is not more than 80 s$^{-1}$, preferably lower than 70 s$^{-1}$. The average shear rate in question (in s$^{-1}$) may be considered as having the value 2 π N r$_c$/t, where N denotes the angular speed of rotation of the core in relation to the mould (in revolutions per s), r$_c$ the diameter of this core and t the mean thickness of the wall of the article. When the manufactured article is not exactly symmetrical in revolution but, for example, includes a local extra thickness which is not symmetrical in revolution, such as a rib parallel to the axis of the article or helical, the thickness t is that measured outside the said extra thickness, that is to say that it is the thickness of the majority of the article.

It has been found that the process of moulding by injection onto a rotating core defined above is particularly advantageous when it is applied to the manufacture of articles in which at least a portion has a thickness of at least 2 mm and more particularly of at least 3 mm. In fact, the moulding by injection onto a rotating core of thermoplastic materials according to a process not in accordance with the invention does not make it possible to manufacture articles which are several millimeters thick exhibiting satisfactory mechanical properties; in particular, their pressure resistance is virtually identical to that which they would have exhibited if they had been injection-moulded without the core being driven in rotation.

EXAMPLES

The following examples illustrate the advantages of the invention, without any limitation being implied.

Cylinders of 25 mm internal diameter, 32 mm external diameter and 150 mm in length were injection-moulded on an injection press of Engel 250 T type fitted with a 55 mm diameter screw. The injection moulding conditions were:

injection speed: 20 mm/s dwell pressure (hydraulic): 40 bars duration of the filling stage: 4 s duration of the dwell stage: 30 s stock temperature: 260° C.

The cylindrical core constituting the male part of the mould was driven by a Mannesman Rexroth hydraulic motor of MZA 210A type (max. torque 500 Nm at 200 rev/min; max. speed 350 rev/min), powered by a Vickers' hydraulic unit).

The thermoplastic material was injected from one end of the mould.

The female part of the mould, stationary, was cylindrical overall, so as to make it possible to manufacture a section of a cylinder as defined above. However, it comprised a cylindrical side cavity allowing the said section of a cylinder to be provided with a perpendicular side cylindrical spout, of 12 mm internal diameter, 18 mm external diameter and 12 mm in length. Radially in relation to the section of a cylinder, the wall of this spout constituted an extra thickness which was not symmetrical in revolution which had approximately 3.5 times the thickness of the wall of the section of a cylinder. During the injection-moulding of this spout its interior did not communicate with the interior of the section of a cylinder; it is only after its injection-moulding and its cooling that these two portions of the injection-moulded article were brought into internal communication by piercing the portion of the wall of the section of a cylinder forming the end wall of the side spout.

The mechanical properties are evaluated by means of measurements of the resistance to instantaneous bursting pressure.

These measurements are performed at ambient temperature, with the aid of a manual pump which permits pressurizing at a rate of 20 bars per second. The cylinder is closed with metal end fittings at both its ends. In order to measure only the effect of the circumferential orientation produced by the rotation of the core, any axial stress of the cylinder is eliminated by connecting the two end fittings with a steel bar which prevents any lengthwise deformation. The cylinder is immersed in a trough filled with water to avoid any risk of explosion. After immersion the cylinder is filled with water to prevent the formation of air pockets. The pressure is increased and a note is taken of the pressure at which the cylinder bursts.

The influence of the injection-moulding and core rotation conditions is demonstrated by the examples which follow.

Comparative Example 1R

An aromatic polyamide of type IXEF® 1022/9005 (Solvay), filled with 50 mass % of glass fibres, is injection-moulded without core rotation. The instantaneous bursting strength of the cylinder obtained is 200 bars.

Comparative Example 2R

Example 1R was repeated, but this time driving the core in rotation, so as to apply to the plastic material a mean shear rate of 45 s$^{-1}$. The core is rotated for 36 s counting from the end of the filling of the mould; that is to say that the rotation continues beyond the end of the dwell stage. The instantaneous bursting strength of the cylinder obtained is 350 bars. However, a recirculation of the glass fibres opposite the extra thickness which is not symmetrical in revolution is noted, and this is where the article breaks, which reflects a local weakness.

Comparative Example 3R

A polyphenylene sulphide (PPS) filled with 40 mass % of glass fibres (GF), marketed by Solvay under the trademark Primef® 4010/9000 is injection-moulded without driving the core in rotation. An instantaneous bursting strength of 120 bars is obtained.

Example 4

Example 2R is reproduced, but this time with the core being driven in rotation for 20 s counting from the end of the filling stage, and so as to produce a mean shear rate of 45 s$^{-1}$. An instantaneous bursting strength of 450 bars is obtained and a section does not reveal any recirculation of the fibres opposite the extra thickness.

Example 5

Example 4 is repeated, but with a mean shear rate of 66 s$^{-1}$ being applied. An instantaneous bursting strength of 450 bars is obtained and a section does not reveal any recirculation of the fibres opposite the extra thickness.

Example 6R

Example 3R is reproduced, but this time with the core driven in rotation for 20 s counting from the end of the filling stage, and so as to produce a mean shear rate of 23 s$^{-1}$. An instantaneous bursting strength of 280 bars is obtained and a section reveals a recirculation of the fibres opposite the extra thickness. It is furthermore in this place that the article has broken.

Example 7

Example 3R is repeated, the core being driven in rotation for 20 s so as to apply a mean shear rate of 45 s$^{-1}$. An instantaneous bursting strength of 340 bars is obtained and a section does not reveal any recirculation of the fibres opposite the extra thickness.

| Example | Material | Rotation of the core (after filling) | | | Instantaneous bursting strength (bars) | Recirculation of the glass fibres |
|---|---|---|---|---|---|---|
| | | | shear rate ($s^{-1}$) | duration (s) | | |
| 1R | Polyamide | no | — | — | 200 | — |
| 2R | IXEF | yes | 45 | 36 | 350 | yes |
| 4 | 1022/9055 | | 66 | 20 | 450 | no |
| 5 | | | | | 450 | no |
| 3R | PPS | no | — | — | 120 | — |
| 6R | Primef | yes | 23 | 20 | 280 | yes |
| 7 | 4010/9000 | | 45 | | 340 | no |

What is claimed is:

1. A process for injection moulding a thermoplastic material in a mould including a rotating core, comprising steps for:

injecting molten thermoplastic material in a filling stage into said mould to fully occupy said mould, and cooling said molten thermoplastic material in a dwell stage under pressure in said mould including a rotating core having a period of rotation of at least ten seconds in which parts of the mould are in relative rotation during at least a portion of the cooling step, the mean shear rate to which the thermoplastic material is subjected being at least 25 $s^{-1}$ and ending this rotation before the end of the dwell stage.

2. The process according to claim 1, in which the thermoplastic material includes at least one polyolefin.

3. The process according to claim 1, in which the thermoplastic material includes at least one semicrystalline thermoplastic polymer.

4. The process according to claim 1, in which the thermoplastic material includes at least one filler.

5. The process according to claim 1, in which the mould has a shape adapted to the manufacture of an article including one or a number of appreciable extra thicknesses which are not symmetrical in revolution.

6. The process according to claim 1, in which the rotation intervenes only during the dwell stage.

7. The process according to claim 1, in which the rotation period is at least 10%, and not more than 90% of the duration of the dwell stage.

8. In a process for the manufacture of articles in which at least a portion of said article has a thickness of at least 2 mm, the improvement comprising manufacturing said articles by moulding a thermoplastic material according to claim 1.

9. A process for moulding a semicrystalline thermoplastic material in a pressurizable mould including a rotating core, comprising steps for:

injecting molten semicrystalline thermoplastic material in a filling stage, said thermoplastic material including at least one polyolefin and at least one filler into said mould to fully occupy said mould, and cooling said molten semicrystalline thermoplastic material in a dwell stage under pressure in said mould, rotating said core to have a period of rotation of at least 10 seconds, parts of the mould being in relative rotation during at least a portion of the cooling step, the mean shear rate to which the thermoplastic material is subjected being at least 25 $s^{-1}$ and ending said rotation before the end of the dwell stage.

* * * * *